United States Patent [19]

Maddux

[11] 3,855,412
[45] Dec. 17, 1974

[54] CURRENT EQUALIZATION MEANS AND METHOD FOR UNEQUALLY LOADED CABLES IN AN ELECTRIC GLASS MELTING FURNACE

[75] Inventor: John F. Maddux, Heath, Ohio

[73] Assignee: Owens-Corning Fiberglas Corporation, Toledo, Ohio

[22] Filed: Oct. 29, 1973

[21] Appl. No.: 410,865

[52] U.S. Cl............................ 13/6, 307/148, 323/6
[51] Int. Cl............................................... C03b 5/02
[58] Field of Search ................. 13/6, 24, 12; 323/6; 317/14 C; 336/175; 307/148

[56] References Cited
UNITED STATES PATENTS

| 1,729,713 | 10/1929 | Dicke | 307/148 |
| 2,490,339 | 12/1949 | De Voe | 13/6 X |
| 3,182,112 | 5/1965 | Torok | 13/6 |
| 3,414,656 | 12/1968 | Lunig | 13/24 X |

Primary Examiner—R. N. Envall, Jr.
Attorney, Agent, or Firm—John W. Staelin; John W. Overman; David H. Wilson

[57] ABSTRACT

Currents flowing in parallel connected supply cables to an electric furnace are balanced through magnetic inductive coupling. A ferromagnetic core placed around a pair of cables conducting current in opposite directions induces opposing current in the cable carrying the higher current and aiding current in the cable carrying the lower current to equalize the current flows.

13 Claims, 3 Drawing Figures

3,855,412

CURRENT EQUALIZATION MEANS AND METHOD FOR UNEQUALLY LOADED CABLES IN AN ELECTRIC GLASS MELTING FURNACE

BACKGROUND OF THE INVENTION

1. Field of the Invention

This invention relates to glass furnaces and more particularly to current equalization in cables providing parallel current paths to the heating electrodes.

2. Description of the Prior Art

In a furnace for resistive heating of a molten material such as glass, a relatively high current flow is required to maintain a predetermined temperature. For example, a current of 3,000 amperes between a single pair of electrodes is not uncommon. In order to carry such a current often-times two or more cables are connected in parallel between the current source and the electrode. If the cables are of the same dimensions and material each will carry an equal fraction of the total current in the circuit and an individual cable need only be of a sufficient diameter to prevent overheating when its fraction of the maximum total current is flowing. However, cable resistances and resistances created when a cable is connected to the source and the electrode vary which creates unequal loading and current flow among the cables. If the current in an individual cable increased due to a resistance variance, the cable might overheat and cause a fire. Previously, the solution has been to reduce the total circuit current which undesirably decreases the glass temperature or to install more costly larger diameter cables to carry the increased current.

SUMMARY OF THE INVENTION

The present invention is intended to overcome current flow differences in unequally loaded cables connected in parallel between a current source and an electrode in a furnace utilizing resistive heating. A ferromagnetic core is placed around a pair of cables carrying current in opposite directions. Since the permeability constant of the core material is much higher than that of air a relatively strong magnetic field will be generated in the core by each conductor. If the currents are flowing in opposite directions, the magnetic fields will oppose one another resulting in a net magnetic field due to any difference in the current flows. This net magnetic field will tend to induce a current flow which opposes the current that produced it and aids the current in the other cable. Therefore, the current difference will be distributed between the two cables and the current flows will be balanced. Since each time a pair of cables is balanced only one of them is required to balance another cable, a group of N parallel cables requires N-1 cores to balance the N current flows.

DESCRIPTION OF THE PREFERRED EMBODIMENT

Figure 1:
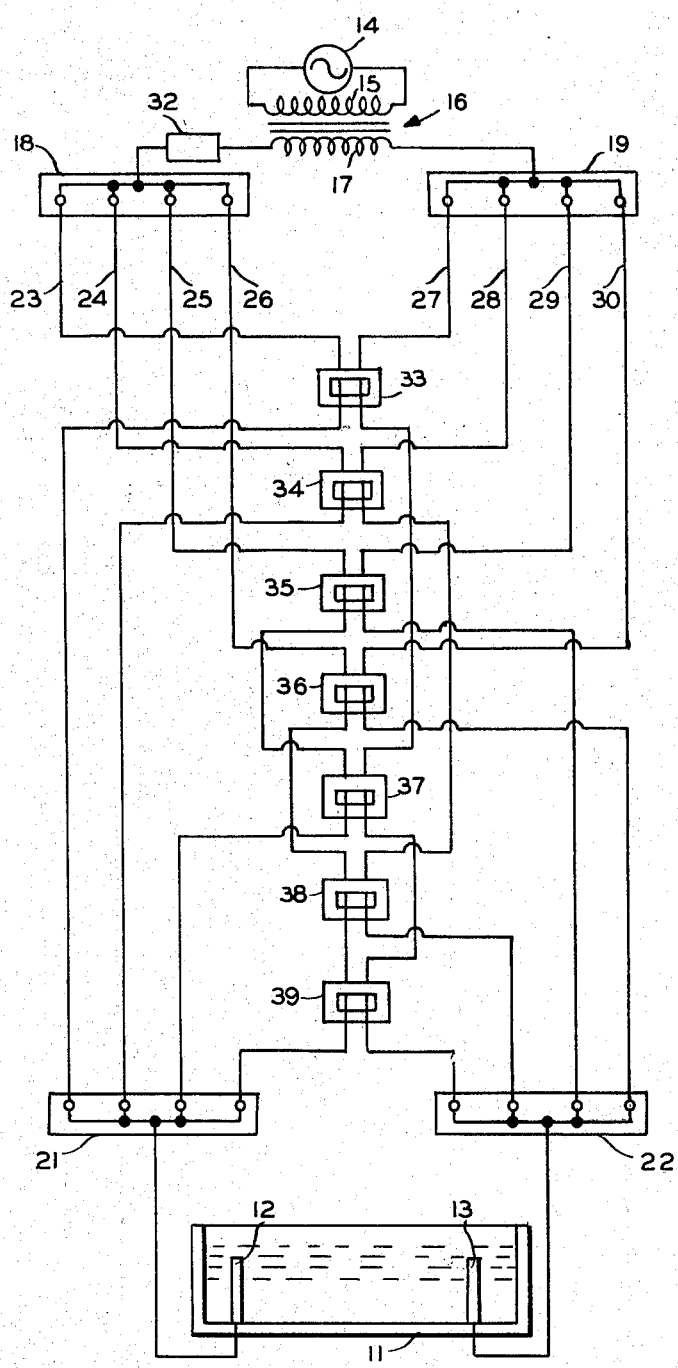
FIG. 1 is a part cross-sectional view and part schematic of the present invention as utilized in a circuit for resistive heating of a molten material in a furnace.

Referring to FIG. 1, there is shown the present invention as applied to a circuit for resistive heating of a molten material in a furnace. Furnace chamber 11 is shown in cross-section and is constructed of a suitable refractory material. A molten material such as glass is maintained at a predetermined temperature in furnace chamber 11 by passing an electric current therethrough between immersed electrodes 12 and 13. The resistance of the molten material to the current flow transfers the electrical energy into heat energy thereby creating Joule heating. Alternating current source 14 is connected to primary winding 15 to apply current through transformer 16. Secondary winding 17 is connected to terminal blocks 18 and 19 which are connected to electrode terminal blocks 21 and 22 respectively by cables to supply current to the molten material. Although terminal blocks 18 and 21 are shown as connected by four cables, 23 through 26, and terminal blocks 19 and 22 also are shown as connected by four cables, 27 through 30, the present invention will perform its intended function with any number of parallel current paths.

Cables 23, 24, 25 and 26 provide four parallel current paths between current source 14 and electrode 12. If these cables are identical in dimensions and material, they should exhibit the same electrical resistance and each should carry one-quarter of the total current flowing in the series circuit formed by secondary winding 17, terminal block 18, cables 23 thorugh 26 in parallel, terminal block 21, electrode 12, the molten material in furnace chamber 11, electrode 13, terminal block 22, cables 27 through 30 in parallel and terminal block 19. Under the conditions of equal current flow each cable need be no larger in diameter than is required to conduct one quarter of the maximum circuit current without overheating. However, variations may occur in the individual cable resistances and in the resistance created when the cables are connected to the terminal blocks thereby disrupting the balanced current flow and causing one or more cables to carry increased current due to a lower resistance. This increased current flow leads to overheating and fires. If the current flows in the cables could be balanced, then the total current flow in the series circuit may be controlled by a current regulating device to produce the maximum current flow in the cables without overheating.

Where the material to be heated has a positive temperature coefficient of resistance, current flow through the material will decrease as the temperature rises to produce a self-regulating effect. However, glass and certain other materials have a negative temperature coefficient of resistance which causes an increase in current flow as the temperature increases to produce a run-away heating condition. As a result, heating circuits for glass and similar materials contain a current regulating device such as device 32 of FIG. 1 to control the current flow thereby maintaining a constant material temperature.

The present invention balances the current flows in unequal loaded cables by placing a core of ferromagnetic material around a parallel pair of cables conducting current in opposite directions. In FIG. 1, cables 23 and 27 pass through an aperture in core 33. Since source 14 is an alternating current source terminal block 18 will be at a positive voltage with respect to terminal block 19 during one-half voltage cycle. Therefore, current will flow from terminal block 18 to terminal block 21 thorugh cables 23 and current will flow in the opposite direction from terminal block 22 to terminal block 19 through cable 27. During the next one-half voltage cycle terminal block 19 will be at a positive voltage with respect to terminal block 18. Therefore, current will flow from terminal block 19 to terminal block 22 through cable 27 and current will flow in the opposite direction from terminal block 21 to terminal block 18 through cable 23. The current flow in cables 23 through 26 will always be opposite the current flow in cables 27 and 30. If I23 represents the current in cable 23 and I27 represents the current in cable 27, then I23 = I27 at any moment in time. Cores 34, 35 and 36 similarly balance the currents in cable pairs 23 and 28, 25 and 29 and 26 and 30 so that I24 = I28, I25 = I29 and I26 = I30. Cables 25 and 27 are now passed through core 37 so that I25 = I27 and since I25 also equals I29 and I27 also equals I23, the currents in cables 23, 25, 27 and 29 are now balanced to produce I23 = I25 = I27 = I29. In a like manner cables 26 and 28 are passed through core 38 so that I26 = I28 and, since I26 also equals I30 and I28 also equals I24, the currents in cables 24, 26, 28 and 30 are now balanced to produce I24 = I26 = I28 = I30. Finally, cables 26 and 27 are passed through core 39 so that I26 = I27 and the currents in all the cables are balanced to produce I23 = I24 = I25 = I26 = I27 = I28 = I29 = I30. Each cable therefore will carry one-quarter of the total series circuit currents as supplied by source 14.

If, for example, the resistance of cable 23 or its connections to terminal blocks 18 and 21 is greater than that resistance required to produce a predetermined current flow in cable 23 the current flow in cable 23 will be reduced and the present invention will distribute that reduction among the eight cables to balance the current flow. Now current regulating device 32 may be adjusted to increase the series current flow to the predetermined value. Similarly, if the resistance of cable 23 or its connections to terminal blocks 18 and 21 is less than required to produce a predetermined current flow in cable 23, the current flow in cable 23 will be increased and the present invention will distribute that increase among the eight cables to balance the current flow. Now current regulating device 32 may be adjusted to decrease the current flow to the predetermined value.

As may be seen from FIG. 1, as the current flows in each pair of oppositely conducting cables are equalized, one of the cables may be eliminated from further use in the current equalization process. Therefore, if N represents the total number of cables in which current flows are to be equalized, N−1 represents the number of cores required to perform the equalization.

Figure 2:
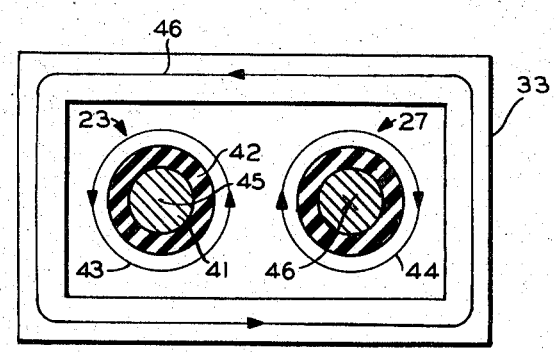
FIG. 2 is a cross-sectional view of the present invention and associated cables.

Referring to FIG. 2, there is shown a cross-sectional view of cables 23 and 27 and core 33. Each cable has an inner conductor and an outer protective insulation such as inner conductor 41 and insulation 42 of cable 23. As current flows through a conductor, a surrounding magnetic field is created which may be represented by lines of induction, line 43 for cable 23 and line 44 for cable 27. If dot 45 represents current flowing toward the viewer then the direction of the magnetic field is found to be counterclockwise by utilizing the "right-hand rule." This rule states that if the wire is grasped with the right-hand with the thumb pointing in the direction of current flow the fingers will curl around the wire in the direction of the magnetic field. Current flow in cable 27 is away from the viewer as represented by the "X" 46 to generate a magnetic field in the clockwise direction. According to Ampere's law the relationship between magnetic field B and the current which produces it I is $\int B \cdot dl = \mu_o I$ where $dl$ is the path over which B is to be integrated and $\mu_o$ is the permeability constant. For a circular conductor the path of integration is the circumference of a circle having a radius $r$ measured from the center of the conductor. Therefore, the magnetic field represented by line 43 will be B23 $= \mu_o I23/2\pi r$. The magnetic field created by currents I23 and I27 flowing in cables 23 and 27 will also be present in core 33. If core 33 is formed of a ferromagnetic material, the value of its permeability constant $\mu_1$ will be much greater than the value of the permeability constant $\mu_o$ for the air surrounding cables 23 and 27. Since the permeability constant is the ratio of the magnetic field to magnetizing force "H" producing it, $\mu = B/H$, and since the magnetizing force is proportional to the current flowing in the wire, the magnetic field induced in core 33 will be much greater than the magnetic field in the surrounding air. If the currents in cables 23 and 27 are equal, I23 = I27 then the magnetic fields induced in core 33 will be equal, B23 = B27, and the net magnetic field in core 33 will be zero. According to Faraday's law of induction, an induced electromotive force (emf) E in a circuit is equal to the negative rate at which the flux through the circuit is changing, E = $-d\phi/dt$, where $d\phi/dt$ is the time rate of change of the flux $\phi$. Flux is the integral of the magnetic field taken over a surface, $\phi = \int B \cdot ds$. The minus sign in Faraday's equation suggests Lenz's law which states that the induced current will appear in such a direction that it opposes the change that produced it. Therefore, the magnetic field induced in core 33 by current I23 of cable 23 will induce a current in cable 23 opposing current I23 and will induce a current in cable 27 aiding current I27. If I23 = I27, the aiding and opposing currents will cancel out and the current flows will remain balanced. However, where for example cable 23 is carrying an increased current I' which is added to current I23 so that I23 + I' > I27 there will be a net magnetic field in core 33 in the direction of induction line 46. The net flux will induce a current in cable 23 which opposes and reduces I' while a current will be induced in cable 27 which aids I27. When the currents in cables 23 and 27 are equal the net flux will disappear and I' will be distributed equally between the two cables so that I23 + I'/2 = I27 + I'/2. Now current regulating device 32 of FIG. 1 may be adjusted to reduce the current in the series circuit by I' to make I23 = I27. In a similar manner, if the current increase had occurred in cable 27 induction line 46 would flow clockwise and the current flow in the cable would be equalized. If the current had decreased by I' the direction of induction line 46 would be reversed and I'/2 would be subtracted from currents I23 and I27. Then current regulating device 32 would be adjusted to increase the current in the series circuit by I'.

Cores 33 through 39 of FIG. 1 are preferably constructed from a ferromagnetic material having a high permeability constant. Although FIGS. 1 and 2 show a generally rectangular shape other forms will perform the current balancing function, such as a ring. Dimensions are not critical, but the aperture through which the cables must pass should be no larger than required to allow the cables to move freely in order to take advantage of the stronger magnetizing force close to the cables. In addition, the cross-sectional area perpendicular to the magnetic field should be large enough to prevent saturation when the maximum magnetic field occurs. The core may also be laminated in order to reduce eddy current loses.

Figure 3:
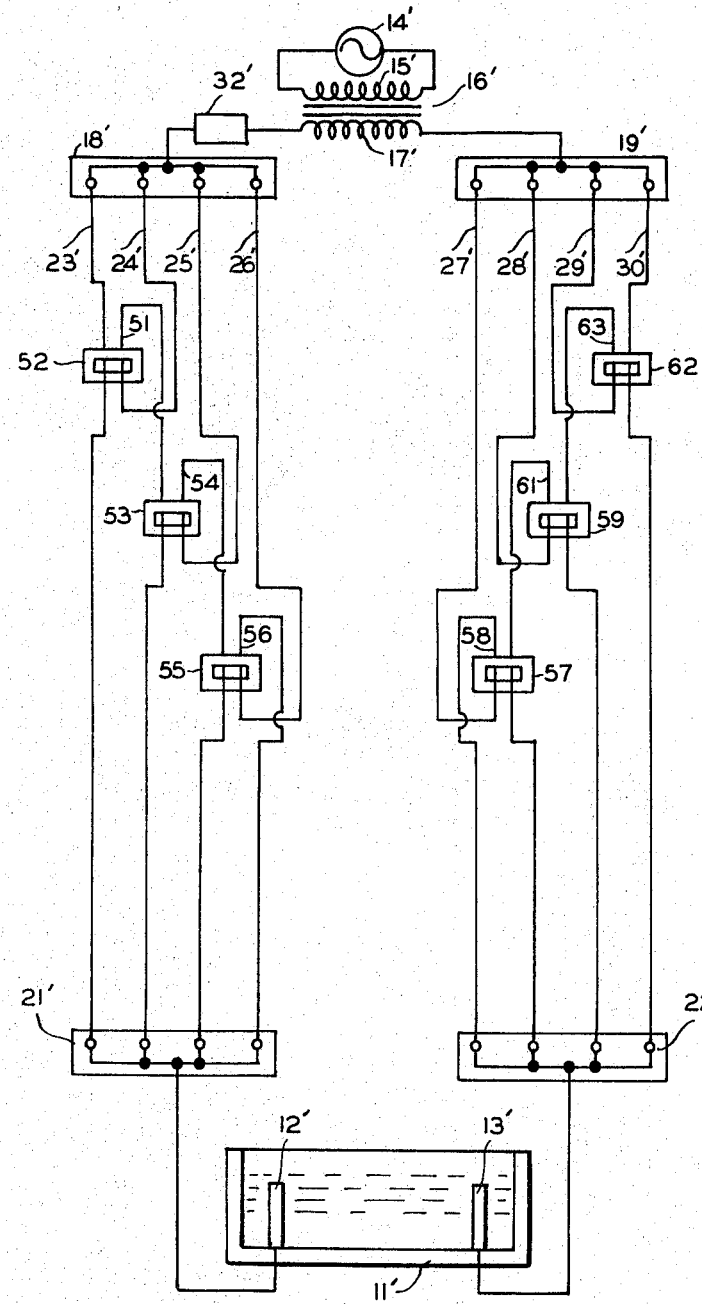
FIG. 3 is a part cross-sectional view and part schematic of an alternate embodiment of the present invention.

FIG. 3 shows an alternate embodiment of the present invention which reduces the number of cores required for N cables from N−1 to N−2 cores. In this embodiment cables coupling like terminal blocks have their currents inductively balanced rather than cables coupling opposed pairs of terminal blocks. Thus cables feeding current in the same direction between the source and load are balanced rather than balancing a cable feeding current to the source against a cable conducting current from the source.

Furnace chamber 11' contains a molten material which may be glass in which electrodes 12' and 13' are immersed. Alternating current source 14' is connected to primary winding 15' of transformer 16' to supply current through secondary winding 17'. Current for heating the molten material by the Joule effect flows in the series circuit defined by secondary winding 17', current regulating device 32', terminal block 18', cables 23' through 26' connected in parallel, terminal block 21', electrode 12', the material in furnace chamber 11', electrode 13', terminal block 22', cables 27' through 30' connected in parallel and terminal block 19'. The current flow in cable 23' and the current flow in cable 24' are balanced by forming a loop 51 in cable 24' as it passes through core 52 so that the current flows in cables 23' and 24' are in opposite directions as the magnetic fields surrounding the cables are inductively coupled. Therefore, I23' = I24' where I23' is the current in cable 23' and I24' is the current in cable 24'. Next cable 24' is passed through core 53 with loop 54 in cable 25' to balance the currents, I24' = I25', and obtain the relationship I23' = I24' = I25'. Core 55 couples cable 25' to loop 56 of cable 26' to balance the currents, I25' = I26' and thereby balance the currents in the four parallel connected cables, I23' = I24' = I25' = I26'.

Since the heating circuit is a series circuit the total current flowing in parallel cables 23' through 26' will also flow through cables 27' through 30' so that there does not need to be coupling between the two groups of parallel cables if the current flow is balanced within each group. Therefore, core 57 couples cables 28' with loop 58 of cable 27' to balance the currents, I27' = I28'. Core 59 couples cable 29' with loop 61 of cable 28' to balance the currents, I28' = I29'. Core 62 couples cable 30' with loop 63 of cable 29' to balance the currents, I29' = I30'. Therefore, the currents in the four parallel connected cables are balanced, I27' = I28' = I29' = I30' and I23' = I24' = I25' = I26' = I27' = I28' = I29' = I30' for the series circuit. Each time a pair of cables passes through a core one of the cables may be eliminated from further coupling. In a circuit with N cables, N/2 cables in each group of parallel connected cables, a total of $(N/2 - 1) + (N/2 - 1) = N-2$ cores will be required to balance the currents utilizing the alternative embodiment.

Another method by which N−2 cores can be utilized to balance the currents in N cables may be demonstrated by reference to FIG. 1. If core 33 is removed from FIG. 1, cable 23 will no longer be coupled to cables 24 through 30. Cores 34, 35 and 36 balance the currents in cable pairs 24 and 28, 25 and 29 and 26 and 30 so that I24 = I28, I25 = I29 and I26 = I30. Cores 37, 38 and 39 balance the currents in cable pairs 25 and 27, 26 and 28 and 26 and 27 so that I25 = I27, I26 = I28 and I26 = I27. Therefore, the currents in these cables are balanced to produce I24 = I25 = I26 = I27 = I28 = I29 = I30. If I is the total current in the series circuit, then I = I27 + I28 + I29 + I30 and the current in each of cables 27 through 30 will be one-quarter of the total current I. The current in each of cables 24, 25 and 26 is equal to current in each of cables 27 through 30 and since I = I23 + I24 + I25 + I26 also, the current in cable 23, I23, will equal one-quarter of the total series circuit current. Any increase or decrease in the total series circuit current will be distributed equally among the cables 23 through 26 as the currents in cables 24 through 30 are balanced. Thus, where cables 27 through 30 constitute a first plurality of cables and cables 23 through 26 constitute a second plurality of cables, a plurality of N−2 or six ferromagnetic cores, each having one cable from the first plurality and one cable from the second plurality passing through an aperture therein, may be utilized to couple each cable of the first plurality and all but one cable of the second plurality to balance the currents in all the cables.

In summary, the present invention balances current flows in parallel connected cables by inductively coupling the magnetic fields of a pair of cables with currents flowing in opposite directions. The net magnetic field generated in the coupling core induces current flow in the cables to oppose the higher current and aid the lower current so that the current flows become equal. Therefore, it will be appreciated that the present invention may also be practiced by forming the ferromagnetic core into a shape which will produce the required magnetic coupling in a pair of parallel cables with current flowing in the same direction. For example, in FIG. 3 there is shown rectangular core 52 with cable 23' and loop 51 of cable 24' passing through an aperture therein. If the right side portion of the plane of core 52 is rotated 180° about the major axis of the rectangle in the direction of the viewer, loop 51 will be eliminated and cables 23' and 24' will pass through the aperture in core 52 with their respective currents flowing in the same direction. However, the magnetic path around core 52 will not have been changed and the magnetic fields generated in core 52 will remain in opposition. Loop 51 in FIG. 3 may also be eliminated without reforming core 52 by running cable 24' directly from terminal block 18' to the near side of the core and through the aperture to exit from the far side. Cable 23' from terminal block 18' enters the aperture from the far side of core 52 and exits from the near side as viewed in FIG. 3 so that the current flows in cables 23' and 24' are in opposition as they pass through core 52. Again N−2 cores can be employed without coupling one cable provided an equal number of parallel cables carry current in each direction in the series circuit between the source and the melt if all currents in one path between the source and the melt as from terminal block 18' to terminal block 21' are equalized by cores 52, 53 and 55 and the proportion of the current in each cable of that path is equalized with the current in all cables but one in the other path. This can be accomplished as by eliminating core 62 and loop 63 in cable 29' and equalizing the current in cable 26' with that in 27' by a core (not shown) through which cables 26' and 27' pass in the same direction so their currents are in opposition as they pass through the core.

Typically, for a pair of parallel cables each carrying about 900 amperes, a core having a cross-section perpendicular to the flux path of 4 square inches has been employed successfully without saturation and significant heating in the core. For example, in a core having a rectangular shape as shown in FIGS. 1 and 3 the cross-section may be 2 by 2 inches.

While there is explained and illustrated the preferred embodiment of my invention, it is to be understood that within the spirit and the scope of the following claims the invention may be practiced otherwise than as specifically illustrated and described.

I claim:

1. An electric furnace for resistive heating of a molten material having a negative temperature coefficient of resistance, comprising:
    a chamber for containing said material;
    a pair of electrodes immersed in said material;
    a source of alternating current;
    current carrying means comprising plural paths connected between each of said pair of electrodes and said source; and
    magnetic coupling means for inductive coupling of a magnetic field generated by each current path of said current carrying means in opposition to at least one other magnetic field generated by another current path of said current carrying means.

2. An electric furnace as defined in claim 1 wherein said current carrying means includes a pair of cables connected in parallel between each of said pair of electrodes and said source.

3. An electric furnace as defined in claim 2 wherein said magnetic coupling means includes a plurality of ferromagnetic cores each having an aperture through which two of said cables may be passed.

4. An electric furnace as defined in claim 3 wherein said cores extend along said cables for a distance of the order of inches.

5. An electric furnace as defined in claim 3 wherein said cores are constructed from a plurality of laminations.

6. An electric furnace as defined in claim 1 wherein said current carrying means includes first and second cables connected in parallel between one of said pair of electrodes and said current source and third and fourth cables connected in parallel between the other one of said pair of electrodes and said current source; said coupling means includes first, second and third ferromagnetic cores; and said first and third cables pass through an aperture in said first core, said second and fourth cables pass through an aperture in said second core and said first and fourth pass through an aperture in said third core.

7. An electric furnace as defined in claim 1 wherein said current carrying means includes first and second cables connected in parallel between one of said pair of electrodes and said current source and third and fourth cables connected in parallel between the other one of said pair of electrodes and said current source; said coupling means includes first and second ferromagnetic cores; said first cable and a loop of said second cable pass through an aperture in said first core such that the magnetic fields generated in said first core by current flowing in said first and second cables are in opposition; and said third cable and a loop of said fourth cable pass through an aperture in said second core such that the magnetic fields generated in said second core by current flowing in said third and fourth cables are in opposition.

8. An electric furnace for Joule effect heating of molten glass comprising:
    a chamber for containing said glass;
    a pair of electrodes immersed in said glass;
    a source of alternating current;
    N current carrying cables between said source and said pair of electrodes including, a first group of N/2 current carrying cables connected in parallel between one of said pair of electrodes and said current source, and a second group of N/2 current carrying cables connected in parallel between the other end of said pair of electrodes and said current source; and
    N−1 ferromagnetic cores each having one cable from said first group and one cable from said second group passing through an aperture therein whereby each of said N cables passes through an aperture in at least one of said N−1 cores.

9. An electric furnace for Joule effect heating of molten glass, comprising:
    a chamber for containing said glass;
    a pair of electrodes immersed in said glass;
    a source of alternating current;
    N current carrying cables between said source and said pair of electrodes including, a first group of N/2 current carrying cables connected in parallel between one of said pair of electrodes and said current source, and a second group of N/2 current carrying cables connected in parallel between the other one of said pair of electrodes and said current source;
    a first group of (N/2) − ferromagnetic cores each having one cable and a loop of another cable from said first group of cables passing through an aperture therein such that the magnetic fields generated in each core of said first group of cores by current flowing in said cables are in opposition and whereby each cable of said first group of cables passes through an aperture in at least one core of said first group of cores; and
    a second group of (N/2) −1 ferromagnetic cores each having one cable and a loop of another cable from said second group of cables passing through an aperture therein such that the magnetic fields generated in each core of said second group of cores by current flowing in said cables are in opposition and whereby each cable of said second group of cables passes through an aperture in at least one core of said second group of cores.

10. An electric furnace for Joule effect heating of molten glass, comprising:
    a chamber for containing said glass;
    a pair of electrodes immersed in said glass;
    a source of alternating current;
    a plurality of current carrying cables connected in parallel between one of said pair of electrodes and said current source; and
    a ferromagnetic core having an aperture therein through which a pair of said cables pass such that the current flows in said cables are in opposition.

11. An electric furnace for Joule effect heating of molten glass, comprising:
- a chamber for containing said glass;
- a pair of electrodes immersed in said glass;
- a source of alternating current;
- a first plurality of current carrying cables connected in parallel between one of said pair of electrodes and said current source;
- a second plurality of current carrying cables connected in parallel between the other one of said pair of electrodes and said current source; and
- a ferromagnetic core having an aperture therein through which a first cable from said first plurality of cables and a second cable from said second plurality of cables pass such that the current flows in said first and second cables are in opposition.

12. An electric furnace as defined in claim 11 wherein the cables of said first and second plurality of cables have substantially equal electrical characteristics.

13. An electric furnace for Joule effect heating of molten glass comprising:
- a chamber for containing said glass;
- a pair of electrodes immersed in said glass;
- a source of alternating current;
- a first plurality of current carrying cables connected in parallel between one of said pair of electrodes and said current source;
- a second plurality of current carrying cables equal in number to said first plurality connected in parallel between the other one of said pair of electrodes and said current source; and
- a plurality of ferromagnetic cores each having an aperture having a pair of said cables passing through said aperture to pass their respective currents at any instant in opposite directions through said aperture, whereby each of said first plurality of cables and at least all but one of said second plurality of cables passes through an aperture in at least one core of said plurality of cores.

* * * * *